United States Patent
Roiss

(10) Patent No.: US 12,214,360 B2
(45) Date of Patent: Feb. 4, 2025

(54) DISTRIBUTION DEVICE FOR SLURRY

(71) Applicant: Röhren- und Pumpenwerk Bauer Ges.m.b.H., Voitsberg (AT)

(72) Inventor: Otto Roiss, Graz (AT)

(73) Assignee: Röhren- und Pumpenwerk Bauer Ges.m.b.H., Voitsberg (AT)

( * ) Notice: Subject to any disclaimer, the term of this patent is extended or adjusted under 35 U.S.C. 154(b) by 306 days.

(21) Appl. No.: 17/765,798

(22) PCT Filed: Sep. 17, 2020

(86) PCT No.: PCT/EP2020/076019
§ 371 (c)(1),
(2) Date: Mar. 31, 2022

(87) PCT Pub. No.: WO2021/063694
PCT Pub. Date: Apr. 8, 2021

(65) Prior Publication Data
US 2022/0339639 A1   Oct. 27, 2022

(30) Foreign Application Priority Data
Oct. 1, 2019 (DE) .......................... 102019215135.3

(51) Int. Cl.
*A01C 23/00* (2006.01)
*B02C 18/06* (2006.01)
*B02C 23/36* (2006.01)

(52) U.S. Cl.
CPC ............ *B02C 23/36* (2013.01); *A01C 23/007* (2013.01); *B02C 18/06* (2013.01)

(58) Field of Classification Search
CPC ............................ A01C 23/002; A01C 23/007
See application file for complete search history.

(56) References Cited

U.S. PATENT DOCUMENTS

2020/0222909 A1 * 7/2020 Quinn .................. A01C 23/002
2022/0087098 A1 * 3/2022 Krampe ............... A01C 23/002

FOREIGN PATENT DOCUMENTS

DE         29715481 U1 *  1/1998  .......... A01C 23/002
DE    202011050654 U1 * 12/2011  .......... A01C 23/003
(Continued)

OTHER PUBLICATIONS

May 28, 2020, Office Action from German Patent and Trade Mark Office in German Patent Application No. 102019215135.3, which this U.S. national phase application claims the benefit of priority.
(Continued)

*Primary Examiner* — Jared O Brown
(74) *Attorney, Agent, or Firm* — Kolisch Hartwell, P.C.

(57) ABSTRACT

An embodiment of a distribution device for a slurry containing liquid and solid constituents, including a housing, a rotor, a driving unit, and an annular air transmission chamber. The housing includes an inlet, end walls at a driving side and opposite, and a plurality of outlets. The rotor is arranged in the housing and rotatable about a rotation axis, with at least one blade arrangement for sweeping over the outlets and an air distribution chamber for distributing compressed air to the blade arrangement(s). The driving unit has a motor outside the housing and a drive shaft coaxial with the rotation axis which passes through the end wall at the driving side and is connected to the rotor. The transmission chamber is coaxial with the rotation axis, outside the drive shaft, and is connected to the air distribution chamber and an inlet for compressed air, in an air-conducting manner.

19 Claims, 7 Drawing Sheets

(56) References Cited

FOREIGN PATENT DOCUMENTS

| DE | 202013008267 | U1 |   | 1/2015  |           |
|----|--------------|----|---|---------|-----------|
| DE | 102015121039 | A1 |   | 6/2017  |           |
| DE | 102018217521 | A1 | * | 2/2020  | A01C 23/002 |
| EP | 3175696      | A1 | * | 6/2017  | A01C 23/002 |
| EP | 3440912      | A1 |   | 2/2019  |           |
| EP | 3744163      | A1 | * | 12/2020 | A01C 23/002 |
| FR | 2851482      | A1 |   | 8/2004  |           |

OTHER PUBLICATIONS

Dec. 18, 2020, International Search Report of the International Search Authority from The European Patent Office, in PCT/EP2020/076019, which is the international application to this U.S. national phase application.

* cited by examiner

DISTRIBUTION DEVICE FOR SLURRY

CROSS-REFERENCE TO RELATED APPLICATIONS

This application is a national phase application of PCT/EP2020/076019, filed Sep. 17, 2020, which claims priority to German Patent Application No. 102019215135.3, filed Oct. 1, 2019, each of which is hereby incorporated by reference.

INTRODUCTION

The invention relates to a distribution device for slurry. The slurry comprises liquid and solid components. The slurry is in particular liquid manure or sewage sludge. The distribution device is used in particular at a manure tanker or the like and serves to distribute the slurry to a plurality of hoses.

DE 10 2015 121 039 A1 shows a previously known distribution device. This distribution device comprises a rotor with multiple blades inside the housing. The blades sweep over the plurality of outlets that lead to the individual hoses. The outlets are thus temporarily closed by the blades. To prevent a low pressure in the outlets or hoses, the distribution device is supplied with compressed air, which flows into the outlets via the blades. In the pre-known arrangement, the compressed air is supplied through a hollow driving shaft.

It is an object of the present invention to provide a distribution device for a slurry containing liquid and solid components, which enables the best possible distribution of the slurry to multiple outlets with low-maintenance operation.

The object is solved by the features of the independent claim. The dependent claims provide advantageous embodiments of the invention.

Thus, the object is solved by a distribution device for slurry. The slurry contains liquid and solid components. In particular, the slurry is liquid manure or sewage sludge. The distribution device comprises a housing with an inlet for the slurry, an end wall at the driving side, an opposite further end wall and multiple outlets. The opposite further end wall is in particular also referred to as the end wall at the inlet side, since the inlet for the slurry is preferably arranged at this end wall, so that the slurry can flow through the end wall at the inlet side into the interior of the housing. For this purpose, the inlet comprises a relatively large diameter, for example in the range from 5 to 30 cm.

The plurality of outlets is arranged at at least one of the two end walls. It is particularly preferred that a plurality of outlets is provided at both end walls. In particular, at least ten outlets are provided at each end wall. The distribution device is configured to distribute the slurry supplied via the inlet to these outlets. In particular, the outlets comprise tubular elements protruding outwardly from the end walls, to which hoses can be connected. Each outlet comprises an opening in the respective end wall and preferably also an opening aligned therewith in a preferred cutting disc, which is mounted at the inside of the housing at the end wall.

Furthermore, the distribution device comprises a rotor rotatably arranged in the housing. The rotor defines a rotation axis. The rotation axis extends in particular perpendicular to the two end walls and in particular through the central points of the two end walls. The rotor is arranged in the interior of the housing and thus between the two end walls. For this purpose, the two end walls are in particular spaced apart from one another, wherein they are preferably connected to each other via a cylindrical housing casing. This cylindrical housing casing surrounds the interior of the housing and the rotor at the radial outside.

The rotor comprises at least one blade arrangement. Particularly preferably, the rotor comprises multiple blade arrangements, for example three, four or six blade arrangements. Each blade arrangement is arranged to sweep over the outlets at the inside of the housing, so that at these places the solid constituents of the slurry are comminuted as far as possible and do not lead to clogging. A cutting plate of the housing can be arranged at the inside of the respective end wall. The cutting plate is in particular annular and comprises a through hole for each outlet. The blade arrangements correspondingly sweep over the inside of the respective cutting plate. The cutting plates are preferably arranged in an exchangeable manner. Each blade arrangement preferably comprises two opposite blades, which sweep over the outlets at the opposite end walls or cutting plates.

Furthermore, the distribution device comprises a driving unit. The driving unit comprises a motor arranged at the outside of the housing and a driving shaft. In particular, the driving shaft is arranged coaxially with the rotation axis of the rotor and is accordingly connected to the rotor for driving the rotor. Particularly preferably, the output shaft of the motor is also arranged coaxially with the rotation axis, so that all shafts extend coaxially with the rotation axis. The motor is preferably a hydraulic motor. The driving shaft passes through the end wall at the driving side and thus connects the motor arranged at the outside to the rotor arranged at the inside.

The rotor comprises an air distribution chamber. This air distribution chamber is arranged to distribute or forward compressed air to the at least one blade arrangement. In particular, the air distribution chamber is designed to distribute the compressed air to the multiple, in particular all, blade arrangements.

The distribution device comprises an air transmission chamber. This air transmission chamber passes through the end wall at the driving side. The air transmission chamber is arranged coaxially with and radially outside of the driving shaft. In particular, it is an annular space. At the outside of the housing, the air transmission chamber is connected to an air inlet for compressed air and at the inside of the housing to the air distribution chamber in an air-conducting manner.

The air transmission chamber allows the compressed air to be transmitted through the driving side end wall into the air distribution chamber of the rotating rotor. The air transmission chamber is arranged annularly at the outside of the driving shaft. This has the advantage that the driving shaft does not have to be designed in such a way that the air can be transferred in its interior. Air transmission through the driving shaft requires a correspondingly large hollow inner diameter of the driving shaft and corresponding apertures in the driving shaft to guide the compressed air into the driving shaft. This is not provided in the present distribution device. Rather, the driving shaft with a correspondingly small diameter can be used here, since the air is transmitted radially outside of the driving shaft in the air transmission chamber. The annular air transmission chamber, in turn, can be formed relatively narrowly, since air is transmitted over its entire circumference and thus sufficient area is available for air transmission. This means that sufficient construction space is available at the end wall at the driving side for the large number of outlets. These outlets are located in particular radially outside of the air transmission chamber.

Preferably, the air distribution chamber is formed by a rotor outer wall at the driving side and a rotor inner wall spaced from the rotor outer wall along the rotation axis. Particularly preferably, the rotor outer wall and the rotor inner wall are substantially perpendicular to the rotation axis. The air distribution chamber needs not to be tightly sealed against the slurry, since compressed air is normally supplied continuously and the air distribution chamber remains free of slurry due to the overpressure. In addition to the rotor outer wall at the driving side, the rotor can comprise a further rotor outer wall. This further rotor outer wall is preferably closer to the inlet and is also referred to as rotor outer wall at the inlet side. The rotor inner wall is then arranged between the two rotor outer walls, preferably closer to the rotor outer wall at the driving side.

The outer rotor walls and the inner rotor wall are arranged in particular perpendicular to the rotation axis. The blade arrangements are arranged radially outside of these walls. The blade arrangements are described in detail below.

The further rotor outer wall comprises preferably an aperture. This aperture is aligned with the inlet for the slurry, so that the slurry can flow through the aperture into the interior of the rotor. This interior region of the rotor is referred to as "slurry chamber". Preferably, the rotor is radially at the outside open at some places, so that the slurry can flow radially outward through the slurry chamber into the free space between the rotor and the housing. In particular, the inflowing slurry is distributed into the slurry chamber through the aperture in the rotor outer wall at the inlet side. From the slurry chamber, the slurry can flow radially outward into the free space between the rotor and the housing. Furthermore, the rotor outer wall at the inlet side is spaced apart from the end wall of the housing at the inlet side, so that the slurry flowing through the inlet can also flow directly radially outward and not only through the aperture into the slurry chamber.

A first width is defined at the rotor. In particular, this is the largest width of the rotor. This first width essentially corresponds to the distance between two opposing blades and the clear distance between the two cutting plates. Furthermore, a second width of the air distribution chamber is defined. Both widths are measured parallel to the rotation axis. The second width describes the largest clear width in the air distribution chamber parallel to the rotation axis. Preferably, it is provided that the second width is at most 50%, particularly preferably at most 35%, especially at most 25%, of the first width. This size ratio ensures that the air distribution chamber is not too large in comparison with the slurry chamber and thus leaves sufficient space for the slurry chamber.

Furthermore, it is preferred that the air distribution chamber is delimited radially at the inside by the driving shaft. The driving shaft thus extends into the air distribution chamber. The air distribution chamber can also be described as an annular space around the driving shaft.

In particular, the following is provided: The air distribution chamber comprises an opening in the rotor outer wall at the driving side. The driving shaft passes through this opening into the interior of the rotor. An annular area of the opening is formed radially outside of the driving shaft, which represents a transition of the air transmission chamber into the air distribution chamber. The opening in the rotor outer wall is thus larger than the outer diameter of the driving shaft, so that the annular region remains outside of the driving shaft in the opening, thereby forming a transition from the air transmission chamber to the air distribution chamber.

Furthermore, it is preferably provided that the driving shaft is flanged to the rotor inner wall and the rotor inner wall is arranged and designed to transmit the torque from the driving shaft to the rest of the rotor. For this purpose, the rotor inner wall is connected in particular to the rotor outer wall at the driving side and/or to the radially outer component of the rotor. Particularly preferably, the driving shaft comprises a shaft flange. This shaft flange is connected, in particular with bolts, to the rotor inner wall. For this purpose, the rotor inner wall can be reinforced with a flange plate.

It is further preferred that the driving unit comprises a motor flange. The driving shaft is rotatably mounted in the motor flange. One side of the motor flange is flanged at the end wall of the housing at the driving side. The motor is flanged to the opposite side of the motor flange. The air inlet is formed at the motor flange. In particular, multiple connection pieces, to which compressed air pipes can be connected are provided at the motor flange. The compressed air is supplied from these connection pieces into the interior of the motor flange.

Particularly preferably, a flushing connection is also provided at the motor flange. A water pipe or compressed air pipe can be connected to the flushing connection. The flushing connection also passes through the interior of the motor flange to the air transmission chamber.

In a preferred embodiment, the air transmission chamber is delimited radially at the outside by an annular region coaxial with the rotation axis. This annular region can be formed in two different ways:

According to the first variant, it is preferably provided that the annular region is a component of the rotor and thus rotates together with the rotor. A first sliding seal is preferably arranged between the annular region, in particular its radial outside, and the motor flange. The first sliding seal is in particular a shaft seal. Particularly preferably, the annular region is formed here by an L-shaped ring in cross section, which is arranged at the outside at the rotor outer wall at the driving side.

According to the second variant, the annular region is arranged at the motor flange side and thus does not rotate with the rotor. The annular region can be an integral part of the motor flange or fixed to the motor flange. Accordingly, the first sliding seal is then preferably arranged between the annular region, in particular its radial outside, and the rotor.

In both variants, the annular region forms the radially outside boundary of the air transmission chamber. In particular, the motor flange protrudes through the end wall at the driving side into the interior of the housing, is distanced from the rotor and the annular region bridges this distance. During operation of the distribution device, slurry in particular is arranged radially outside of the annular region, in the small distance between the rotor and the motor flange. The annular region delimits the air transmission chamber relative to the slurry.

Furthermore, it is preferred that the air transmission chamber is delimited radially at the inside via the motor flange and/or the driving shaft. A second sliding seal, in particular as a shaft seal, is preferably arranged between the driving shaft and the motor flange. For this purpose, a corresponding sliding sleeve can be arranged at the driving shaft. Since, as already described, the driving shaft preferably extends into the air transmission chamber and is flanged to the rotor inner wall, this second seal must seal up the air transmission chamber and/or air distribution chamber towards the rotary bearing of the driving shaft.

A flange annular chamber is preferably formed at the motor flange. This flange annular chamber merges into the air transmission chamber. The air inlet communicates with the flange annular chamber, and in particular the flange annular chamber is connected in an air-conducting manner to the multiple connection pieces for the compressed air.

In the following, a blade arrangement of the rotor is explained in more detail. Particularly preferably, the rotor comprises a plurality of the blade arrangements. In particular, all blade arrangements are of the same design.

The individual blade arrangement comprises a cavity and at least one ring-shaped or tubular blade. The interior of the ring-shaped or tubular blade can in particular constitute a part of this cavity of the blade arrangement. The cavity of the blade arrangement is connected to the air distribution chamber in an air-conducting manner. As a result, the compressed air can also flow into the interior of the ring-shaped or tubular blade. As the rotor rotates, the blade sweeps over the outlets at the inside of the housing, in particular the corresponding cutting plate. In the process, the cavity of the blade arrangement is connected to the respective outlet via the ring-shaped or tubular blade in an air-conducting manner. This allows the compressed air to flow from the air distribution chamber through the cavity of the blade arrangement into the outlet.

It is particularly preferred that each blade arrangement comprises a tube. Preferably, at least one blade is mounted in the tube via plain bearing. The blade is movable parallel to the rotation axis via the plain bearing. Furthermore, it is preferably provided that the blade is spring-loaded and is pressed outward via the spring.

Particularly preferably, two blades are arranged per blade arrangement and thus in each tube. In this embodiment, outlets are provided at both end walls of the housing. In particular, the two blades are pressed outward by a shared spring. The common tube and the two blades together form a cavity that must be supplied with compressed air.

Each cavity, in particular each tube, preferably comprises at least one through-hole. The through-hole connects the cavity directly to the air distribution chamber or indirectly via an intermediate chamber to the air distribution chamber.

In a preferred embodiment, the cavity of at least one blade arrangement is connected via a through-hole to an intermediate chamber of the rotor in an air-conducting manner. In particular, the cavities of multiple blade arrangements are connected in an air-conducting manner to a common intermediate chamber of the rotor via a respective through-hole.

The intermediate chamber in turn is connected to the air distribution chamber in an air-conducting manner. The rotor can comprise multiple intermediate chambers.

The rotor may comprise a rotor radial wall to form the intermediate chamber. The intermediate chamber is then arranged radially outside of this rotor radial wall. at the radial outside, the intermediate chamber can be delimited by further walls and/or via the tubes of the blade arrangements.

It is particularly preferred that the intermediate chamber comprises a radial air opening. This radial air opening extends in the radial direction, in particular via the rotor radial wall. The radial air opening extends at least partially in the direction of the slurry chamber. The rotor inner wall preferably comprises an axial air opening. The axial air opening extends through the rotor inner wall in the direction of the slurry chamber. In order to connect the axial air opening in the rotor inner wall to the radial air opening in the rotor radial wall, a transition piece is provided. This transition piece connects the axial air opening with the radial air opening and thus connects the air distribution chamber with the intermediate chamber. The transition piece extends via the slurry chamber of the rotor. Via this design, it is possible to connect the air distribution chamber with a relatively large cross-section (cross-section of the axial air opening, radial air opening and transition piece) to the intermediate chamber in the case of a relatively narrow air distribution chamber.

The invention further comprises a vehicle, configured as a trailer or self-propelled vehicle, with a tank for transporting the slurry. The vehicle comprises at least one of the distribution devices described herein. The inlet of the distribution device is thereby connected to the tank.

Hoses for distributing the slurry to an agricultural area are arranged at the outlets.

BRIEF DESCRIPTION OF THE FIGURES

Further details, advantages and features of the present invention will be apparent from the following description of an embodiment based on the drawing. It shows.

DETAILED DESCRIPTION

Figure 1:
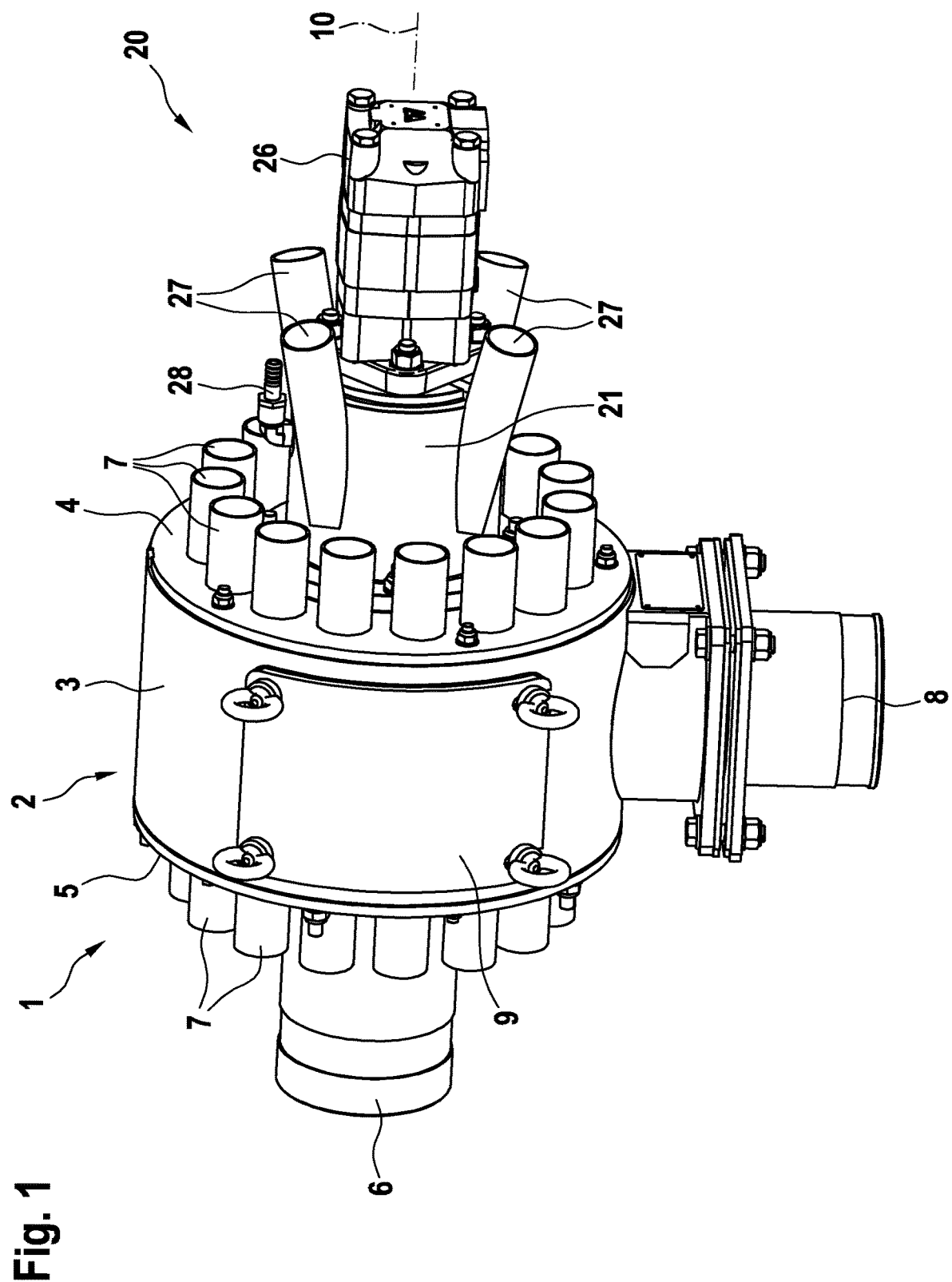
FIG. 1 a distribution device of the invention according to an embodiment.

In the following, a distribution device 1 is described in detail based on the figures. Unless explicitly stated otherwise, reference is always made to all figures.

The distribution device 1 is designed for distributing slurry, in particular liquid manure or sewage sludge. The distribution device 1 is configured for arrangement at a vehicle with a tank for receiving the slurry.

The distribution device comprises a housing 2, a driving unit 20 and a rotor 40. The rotor 40 is arranged in the interior of the housing 2.

The housing 2 comprises a housing casing 3 between an end wall 4 at the driving side and an end wall 5 at the inlet side. The two end walls 4, 5 are bolted to the housing casing 3. The housing casing 3 with the two end walls 4, 5 forms the interior of the housing 2, in which the rotor 40 is arranged. The rotor 40 rotates about a rotation axis 10. The rotation axis 10 intersects the two end walls 4, 5.

The driving unit 20 is flanged to the end wall 4 at the driving side. This is explained in detail with reference to FIG. 2.

An inlet 6 is formed coaxially with the rotation axis 10 at the end wall 5 of the housing 2 at the inlet side. The slurry can enter the interior of the housing 2 through this inlet 6. At the opposite side, at the end wall 4 at the driving side, the driving unit 20 is also flanged coaxially with the rotation axis 10. A plurality of outlets 7 are arranged at both end walls 4, 5. At the end wall 5 at the inlet side, the outlets 7 are arranged around the inlet 6. At the end wall 4 at the driving side, the outlets 7 are arranged around the flanged driving unit 20. For further distribution of the slurry, hoses can be connected to the outlets 7, which here comprise short pipe sections.

The housing 2 comprises at least one cover 9 at the housing casing 3. The cover 9 is screwed to the rest of the housing casing 3 and can be opened for inspection purposes.

Furthermore, the housing 2 comprises a drain 8 at the underside of the housing casing 3. This drain 8 can be used to discharge undistributed slurry or large solids from the interior of the housing 2.

Figure 2:
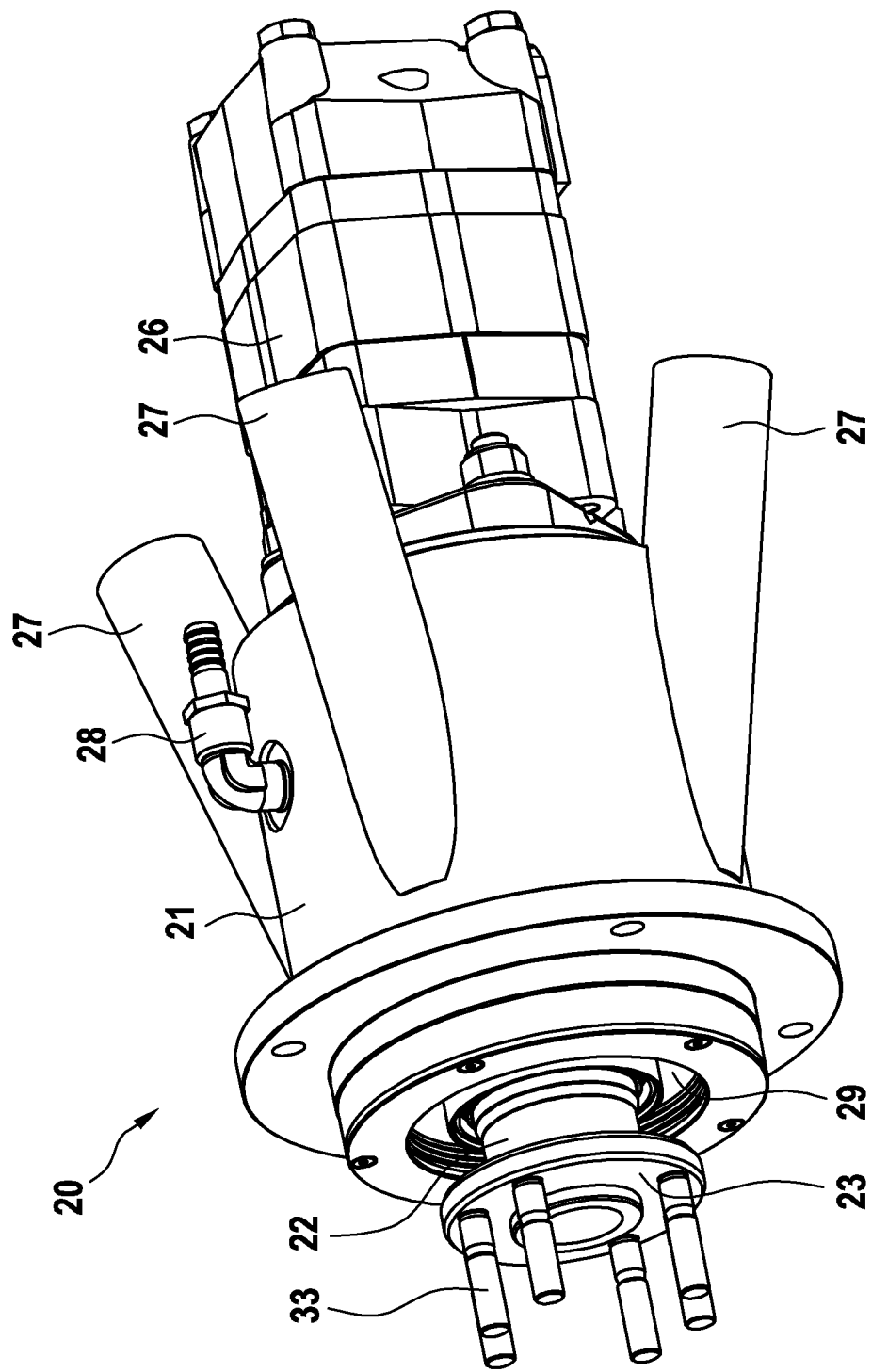
FIG. 2 a driving unit of the distribution device of the invention according to the embodiment, FIG. 3 a section view of the distribution device of the invention according to the embodiment, FIG. 4 a rotor of the distribution device of the invention according to the embodiment, FIG. 5 a further view of the rotor of the distribution device of the invention according to the embodiment, FIG. 6 a rotor inner wall of the rotor of the distribution device of the invention according to the embodiment, FIG. 7 a first section view of the rotor of the distribution device of the invention according to the embodiment, and FIG. 8 a second section view of the rotor of the distribution device of the invention according to the embodiment.

As shown, for example, in FIG. 2, the driving unit 20 comprises a motor flange 21. The motor flange 21 can be flanged to the housing 2.

Furthermore, the driving unit 20 comprises a driving shaft 22. A shaft flange 23 is formed at the inside end of the driving shaft 22. Multiple bolts 33 extend from this shaft flange 23 parallel to and offset from the rotation axis 10. The connection of the driving shaft 22 to the rotor 40 at the inside is explained in more detail with reference to FIG. 3.

FIG. 2 further illustrates that the motor flange 21 comprises an air inlet 27 with four connection pieces for compressed air. Via each air inlet 27, compressed air can be led into the interior of the motor flange 21, in particular into a flange annular chamber 29 (see FIG. 3). In addition to the air inlet 27, a flushing port 28 is provided at the motor flange 21. The flushing connection 28 is used to connect a corresponding pipe and also extends in the interior of the motor flange 21 to the flange annular chamber 29.

Furthermore, the driving unit 20 comprises a motor 26, here formed as a hydraulic motor. The outside end of the driving shaft 22 is connected to the output shaft of the motor 26 in a torque-transmitting manner.

Figure 3:
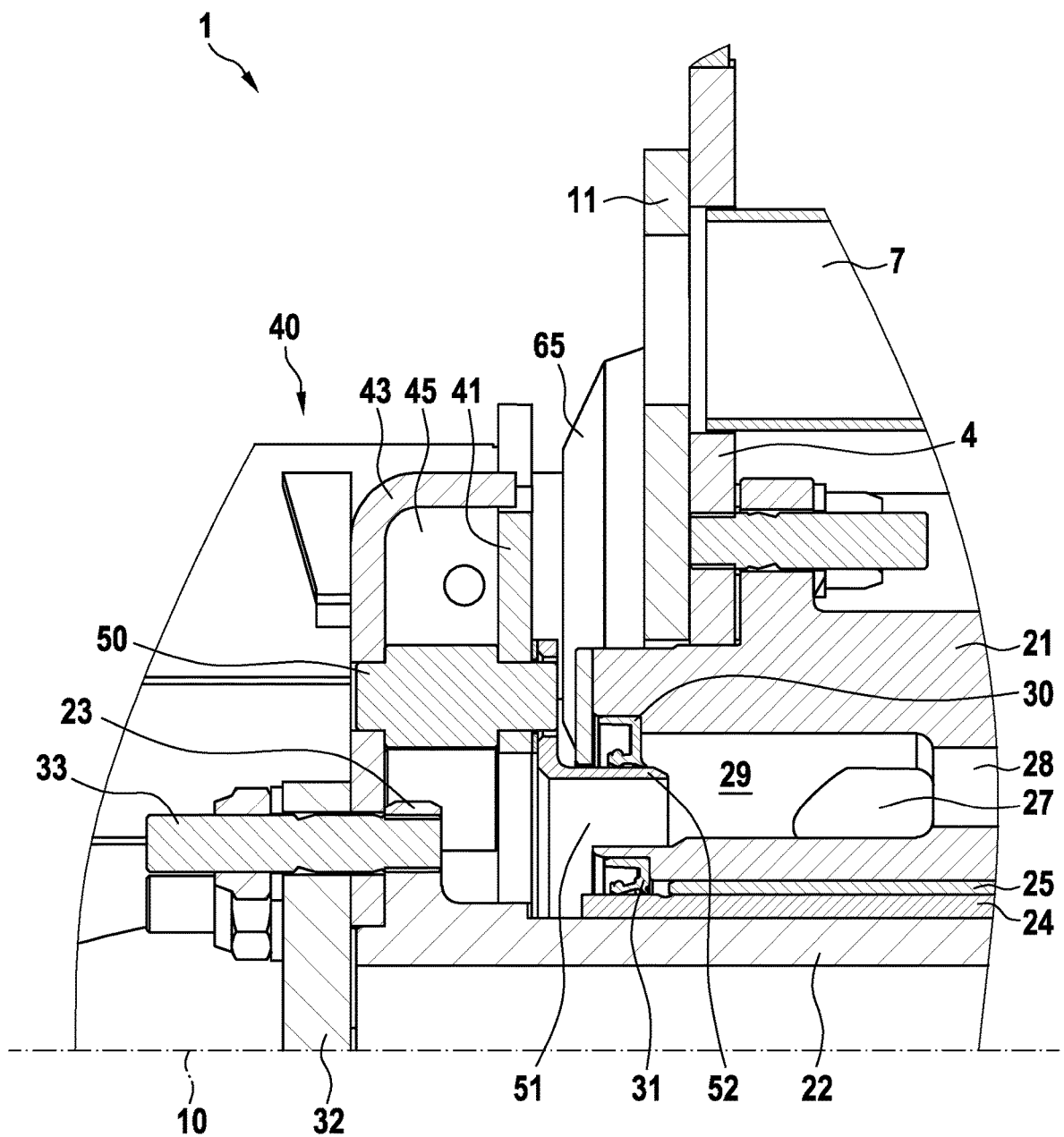

FIG. 3 shows a section view of a detail of the distribution device 1. The rotation axis 10 lies in the section plane. FIG. 3 shows a part of the rotor 40. In its entirety, the rotor 40 is shown, for example, in FIGS. 4 and 5.

Furthermore, FIG. 3 shows that the housing 2 comprises a cutting plate 11 as the inside closure of the outlets 7. At the opposite side, i.e. at the inside of the end wall 5 at the inlet side, such a cutting plate 11 is also arranged. The cutting plate 11 is replaceable. The cutting plate 11 comprises a corresponding through opening to each outlet 7. When the rotor 40 rotates, the blades 65 of the rotor 40 sweep over the inside of the housing 2, in the embodiment shown at the inside of the corresponding cutting plate 11.

FIG. 3 further shows that a sliding sleeve 24 extends at the driving shaft 22. A corresponding plain bearing 25 is provided between the sliding sleeve 24 and the motor flange 21, so that the driving shaft 22 can rotate about the rotation axis 10 relative to the motor flange 21. The rotor 40 is supported exclusively by the driving shaft 22.

Figure 5:
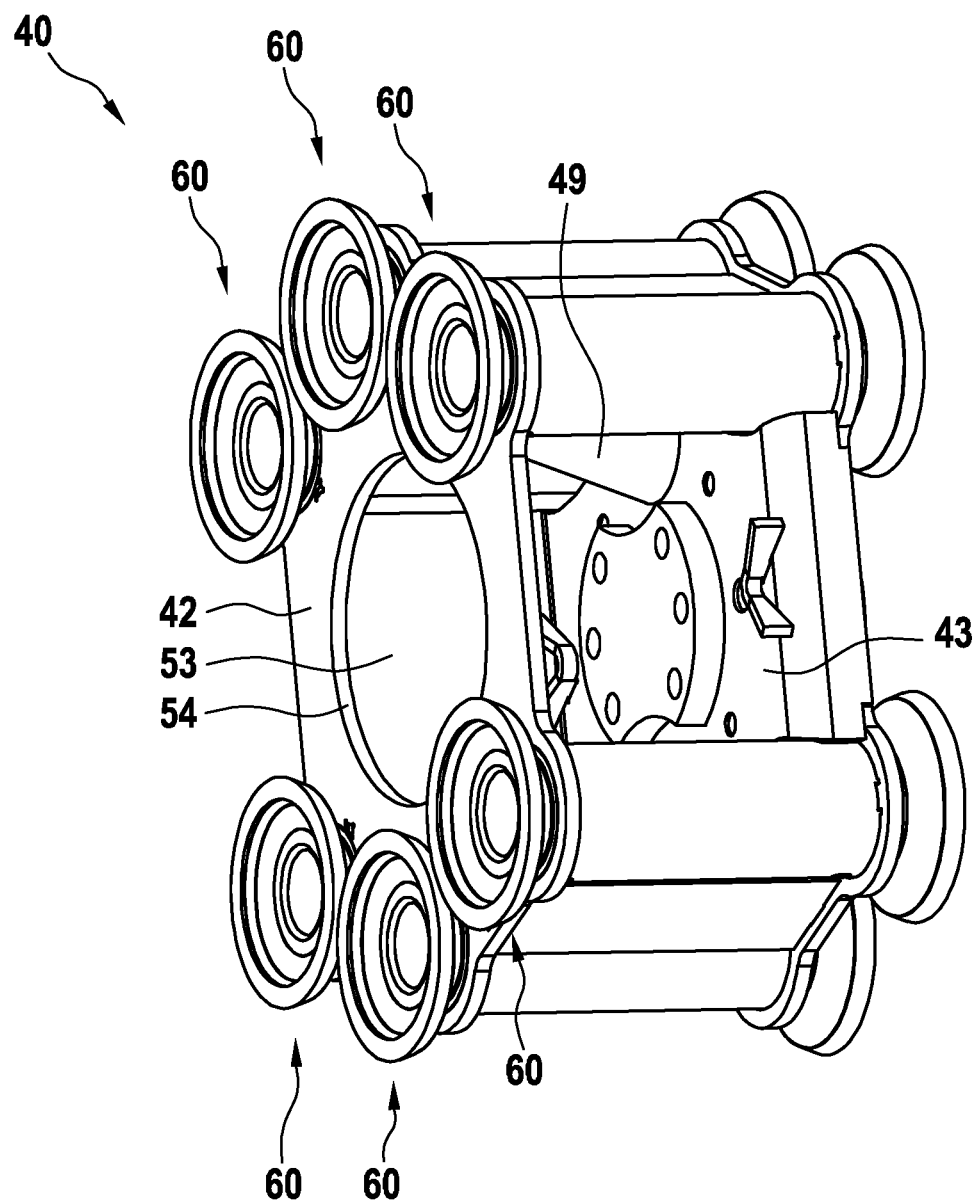

The rotor 40 comprises a rotor outer wall 41 at the driving side and a rotor outer wall 42 at the inlet side (see FIG. 5). Between these two rotor outer walls 41, 42, the rotor 40 comprises a rotor inner wall 43. The two rotor outer walls 41, 42 as well as the rotor inner wall 43 are essentially perpendicular to the rotation axis 10. As FIG. 3 shows, the rotor inner wall 43 is arranged relatively close to the rotor outer wall 41 at the driving side. An air distribution chamber 45 is formed between the rotor outer wall 41 at the driving side and the rotor inner wall 43.

The driving shaft 22 extends through the end wall 4 at the driving side into the interior of the rotor 40 and thus also into the interior of the air distribution chamber 45. The shaft flange 32 at the end of the driving shaft 22 is fixed connected to the rotor inner wall 43 via the bolts 33. For this purpose, the rotor inner wall 43 is reinforced with a flange plate 32.

In the air distribution chamber 45 of the rotor 40, multiple spacers 50 can be arranged between the rotor outer wall 41 at the driving side and the rotor inner wall 43 to stabilize and provide clearance. These spacers 50 are formed relatively small compared with the size of the air distribution chamber 45 and have no significant influence on the volume of the air distribution chamber 45.

FIG. 3 also shows the aforementioned flange annular chamber 29 in the motor flange 21. The air inlet 27 from the connection pieces extends at an angle to the rotation axis 10 and communicates in this flange annular chamber 29. Also, the flushing connection 28 communicates with the flange annular chamber 29.

The flange annular chamber 29 is open axially in the direction of the rotor 40. Furthermore, in the embodiment shown here, the motor flange 21 extends through the end wall 4 at the driving side and through the cutting plate 10 into the interior of the housing 2.

The transition from the air inlet 27, in particular the flange annular chamber 29, into the air distribution chamber 45 is referred to as the air transmission chamber 51. This air transmission chamber 51 is delimited radially outside via an annular region 52. In the embodiment shown, the annular region 52 is connected to the rotor 40 in a rotationally fixed manner. In particular, a ring with an L-shaped cross section is used for this purpose, which is arranged at the outer side at the rotor outer wall 41 at the driving side.

A first seal 30 is provided at the radial outside of the annular region 42. The first seal 30 seals between the annular region 52 and the motor flange 21.

Radially at the inside, the air transmission chamber 51 is delimited by the motor flange 21 and the driving shaft 22. Here, a second seal 31 seals between the motor flange 21 and the driving shaft 22, in particular the sliding sleeve 24.

Figure 4:
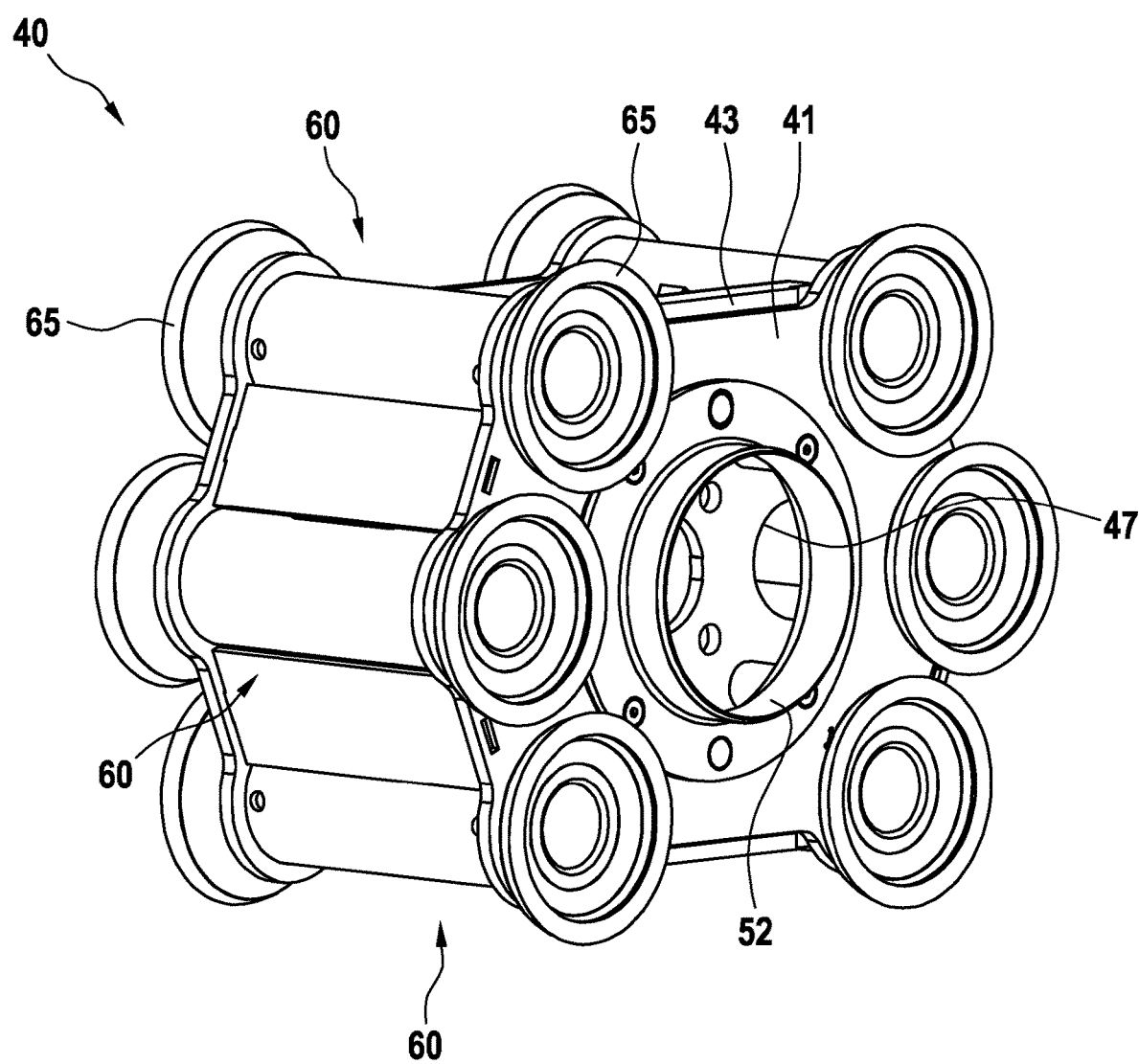
Figure 6:
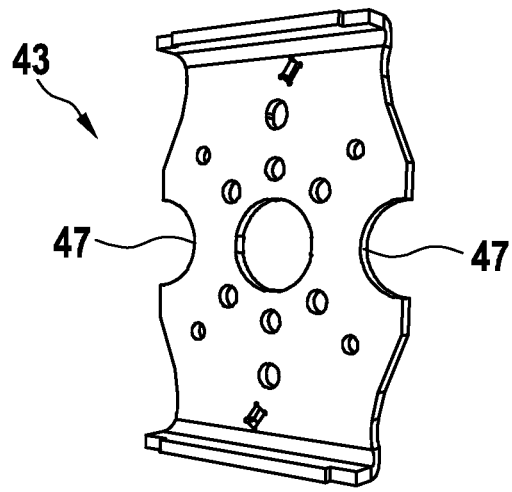
Figure 7:
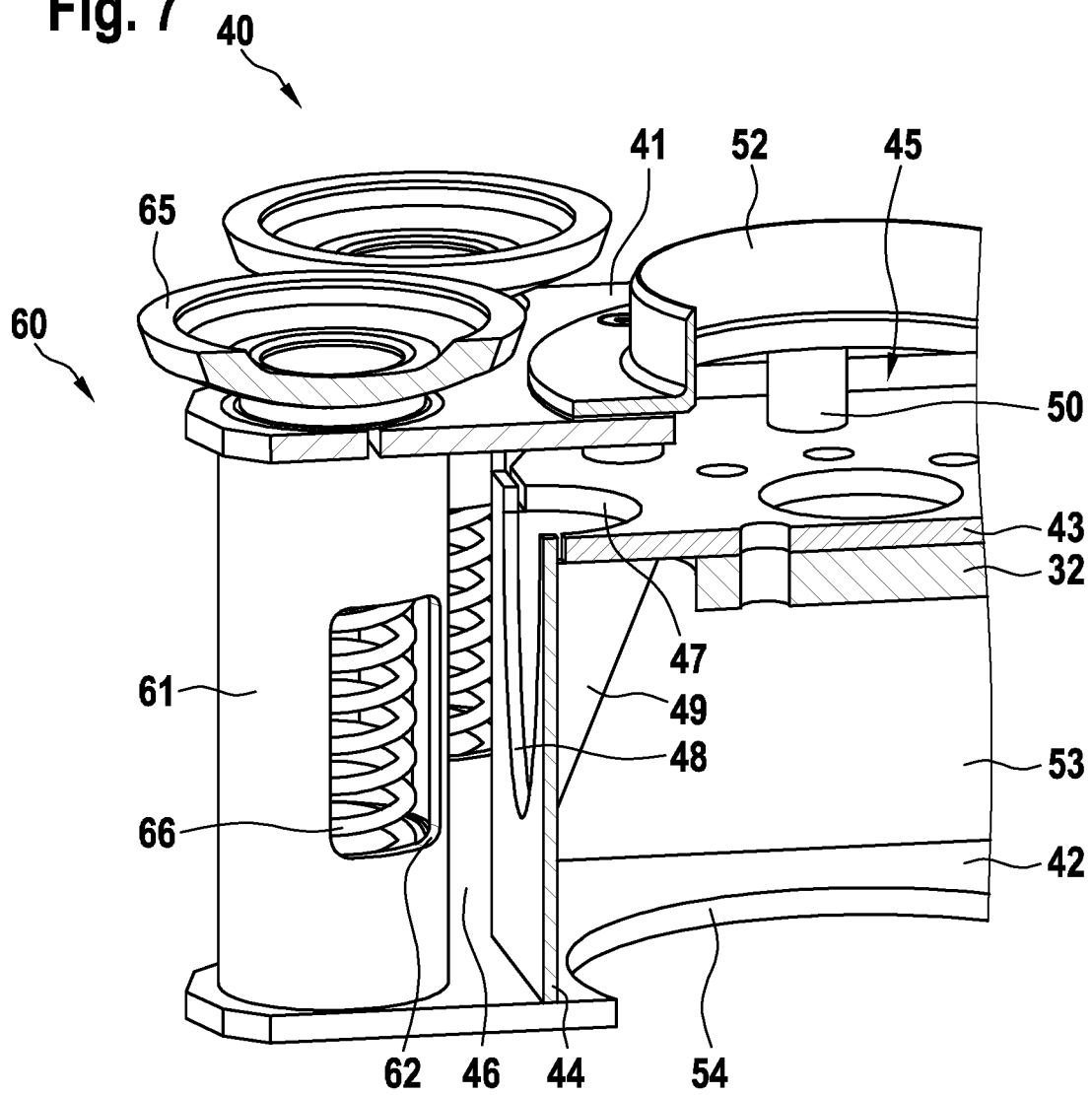
Figure 8:
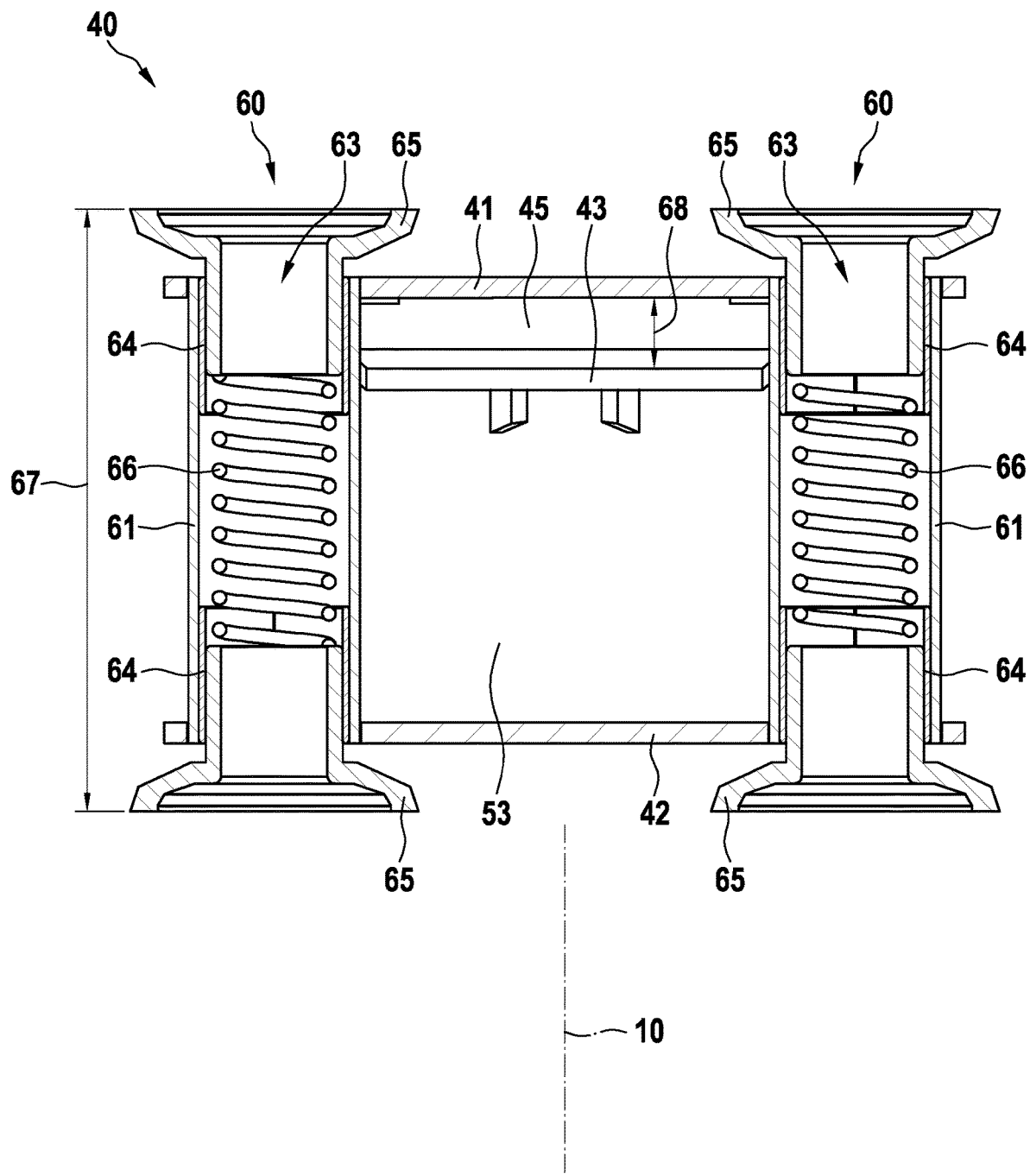

FIG. 4 shows the entire rotor 40 from the driving side. FIG. 5 shows the entire rotor 40 from the inlet side. FIG. 6 shows the rotor inner wall 43 in detail. FIGS. 7 and 8 show section views of the rotor 40.

As already described, the rotor 40 comprises a rotor outer wall 42 at the inlet side. According to FIG. 5, an aperture 54 is formed in this rotor outer wall 42 at the inlet side. This aperture 54 is aligned with the inlet 6. The rotor outer wall 42 at the inlet side is spaced from the housing 2. As a result, slurry flowing in through the inlet 6 can still flow radially outward before the rotor outer wall 42 at the inlet side. At the same time, however, a substantial part of the slurry also flows through the rotor outer wall 42 at the inlet side into the interior of the rotor 40. A slurry chamber 53 is thus formed in the rotor 40. The slurry chamber 53 is defined via the distance between the rotor inner wall 43 and the rotor outer wall 42 at the inlet side. As shown in particular in FIG. 5, the rotor 40 is radially open at two opposite sides, so that slurry can flow radially outward from the slurry chamber 53 into the direction of the housing 3.

The two section views in FIGS. 7 and 8 show the structure of the individual blade arrangements 60. In the shown embodiment, the rotor 40 comprises six blade arrangements 60. However, the rotor 40 may also comprise, for example, two, three, four, five, seven or eight blade arrangements 60.

The single blade arrangement 60 comprises a tube 21. The tube 21 is fixedly connected to the two rotor outer walls 41, 42. Two opposing tubular blades 65 are arranged in the tube 21. The blades 65 are slidably movable in corresponding blade plain bearings 64 parallel to the rotation axis 10. For this purpose, a spring 66 is arranged between the two blades 65. The spring 66 presses the two blades 65 apart and thus against the cutting plates 11. The tube 61 with the tubular blades 65 forms a cavity 63 in the interior of the respective blade arrangement 60. Via this cavity 63, compressed air can flow outward in the axial direction, namely via the blades 65 into the respective outlet 7.

In particular, FIG. 7 shows that each tube 61 comprises a through-hole 62. The rotor 40 comprises at least one rotor radial wall 44 radially inside the blade arrangements 60. The outer blade arrangements 60 and the rotor radial wall 44 lying within them form an intermediate chamber 46. In the shown embodiment, the through-holes 62 of respective three blade arrangements 60 communicate with the intermediate chamber 46. Accordingly, the rotor 40 comprises two of the intermediate chambers 46.

The intermediate chambers 46 are in turn connected to the air distribution chamber 45 in an air-conducting manner. However, with a different design, there can also be another connection, for example a direct connection, between the air distribution chamber 45 and the cavity 63.

In the shown embodiment, the rotor inner wall 43 comprises an axial air opening 47. The rotor radial wall 44 comprises a radial air opening 48. The two openings 47, 48 are connected to each other via a transition piece 49. This transition piece 49 separates the air-carrying connection between the intermediate chamber 46 and the air distribution chamber 45 opposite to the slurry chamber 53.

FIG. 8 further shows that the entire rotor 40 comprises a first width 67 parallel to the rotation axis 10. The largest width of the air distribution chamber 45, also parallel to the rotation axis 10, is indicated as the second width 68. The second width 68 is substantially smaller than the first width 67.

In addition to the foregoing written description of the invention, explicit reference is hereby made to the drawn embodiment of the invention in all of the figures for supplementary disclosure thereof.

REFERENCE SIGNS 1 distribution device
2 housing
3 housing casing
4 end wall at the driving side
5 end wall at the inlet side
6 inlet
7 outlets
8 drain
9 cover
10 rotation axis
11 cutting plate
20 driving unit
21 motor flange
22 driving shaft
23 shaft flange
24 sliding sleeve
25 sliding bearing
26 motor
27 air inlet
28 flushing connection
29 flange annular chamber
30 first seal
31 second seal
32 flange plate
33 bolt
40 rotor
41 rotor outer wall at the driving side
42 rotor outer wall at the inlet side
43 rotor inner wall
44 rotor radial wall
45 air distribution chamber
46 intermediate chamber
47 axial air opening
48 radial air opening
49 transition piece
50 spacer (s)
51 air transmission chamber
52 annular region
53 slurry chamber
54 aperture
60 blade arrangement
61 tube
62 recess
63 cavity
64 blade sliding bearing
65 tubular blade
66 spring
67 first width
68 second width The present disclosure relates to a distribution device (1) for a slurry containing liquid and solid constituents, comprising: a housing (2) with an inlet (6) for the slurry, an end wall (4) at the driving side, an opposite further end wall (5) and multiple outlets (7) at at least one of the two end walls (4, 5) for distributing the slurry, a rotor (40), which is arranged in the housing (2) and rotatable about a rotation axis (10) and comprises at least one blade arrangement (60) for sweeping over the outlets (7) at the inside of the housing and an air distribution chamber (45) for distributing compressed air to the blade arrangement(s) (60), a driving unit (20) with a motor (26), which is arranged outside of the housing (2), and a driving shaft (22), which is coaxial to the rotation axis (10), passes through the end wall (4) at the driving side and is connected to the rotor (40) in a rotationally fixed manner, and an annular air transmission chamber (51), which passes through the end wall (4) at the driving side and is arranged coaxially with the rotation axis (10) and radially outside of the driving shaft (22), wherein the air transmission chamber (51) is connected to an air inlet (27) at the outside of the housing for compressed air and to the air distribution chamber (45) at the inside of the housing in an air-conducting manner.

The present disclosure may include one or more of the following concepts, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A distribution device (1) for slurry comprising liquid and solid constituents, comprising:
    a housing (2) with an inlet (6) for the slurry, a end wall (4) at a driving side, an opposite further end wall (5) and a plurality of outlets (7) at at least one of the two end walls (4, 5) for distributing the slurry,
    a rotor (40), which is arranged in the housing (2) and rotatable about a rotation axis (10), with
        at least one blade arrangement (60) for sweeping over the outlets (7) at the inside of the housing, and
        an air distribution chamber (45) for distributing compressed air to the blade arrangement(s) (60), a driving unit (20) with a motor (26), which is arranged outside the housing (2), and a drive shaft (22), which is coaxial with the rotation axis (10), passes through the end wall (4) at the driving side and is connected to the rotor (40) in a rotationally fixed manner, and an annular air transmission chamber (51), which passes the end wall (4) at the driving side and is arranged coaxially with the rotation axis (10) and radially outside the drive shaft (22), wherein the air transmission chamber (51) is connected to an air inlet (27) for compressed air at the outside of the housing and to the air distribution chamber (45) at the inside of the housing in an air-conducting manner.

A1. The distribution device according to paragraph A0, wherein the air distribution chamber (45) is formed by a rotor outer wall (41) at the driving side and a rotor inner wall (43) spaced from the rotor outer wall (41) along the rotation axis (10).

A2. The distribution device according to any of the preceding paragraphs, wherein the air distribution chamber (45) is delimited radially inwardly by the drive shaft (22).

A3. The distribution device according to paragraphs A1 and A2, wherein the air distribution chamber (45) comprises an opening in the rotor outer wall (41) at the driving side, through which the drive shaft (22) extends, wherein radially outside the drive shaft (22) an annular region of the opening is formed as a transition of the air transmission chamber (51) into the air distribution chamber (45).

A4. The distribution device according to any of paragraphs A1 to A3, wherein the drive shaft (22) is flanged to the rotor inner wall (43) and the rotor inner wall (43) is arranged to transmit the torque from the driving shaft (22) to the rest of the rotor (40).

A5. The distribution device according to any of the preceding paragraphs, wherein the driving unit (20) comprises a motor flange (21), wherein the drive shaft (22) is rotatably mounted in the motor flange (21), wherein one side of the motor flange (21) is flanged to the end wall (4) of the housing (2) at the driving side and the motor (26) is flanged to the opposite side, and wherein the air inlet (27) is formed at the motor flange (21).

A6. The distribution device according to any of the preceding paragraphs, wherein the air transmission chamber (51) is delimited radially at the outside by an annular region (52), which is coaxial with the rotation axis (10), wherein
the annular region (52) is a component of the rotor (40) and a first sliding seal (30) is arranged between the annular region (52), in particular at its radial outside, and the motor flange (21),
or the annular region is arranged at the motor flange side and a first sliding seal is arranged between the annular region, in particular at its radial outside, and the rotor.

A7. The distribution device according to paragraph A6, wherein the motor flange (21) protrudes through the end wall (4) at the driving side into the interior of the housing (2), is thereby spaced from the rotor (40) and the annular region (52) bridges this distance.

A8. The distribution device according to any of paragraphs A5 to A7, wherein the air transmission chamber (51) is delimited radially at the inside by the motor flange (21) and/or the drive shaft (22).

A9. The distribution device according to any of the preceding paragraphs, wherein the at least one blade arrangement (60) comprises a cavity (63) and at least one annular or tubular blade (65), wherein the cavity (63) is connected in an air-conducting manner to the air distribution chamber (45), wherein the blade (65) sweeps over the outlets (7) at the inside of the housing when the rotor (40) is rotated and thereby the cavity (63) is connected in an air-conducting manner to the outlet (7) through the annular or tubular blade (65).

A10. The distribution device according to paragraph A9, wherein the cavities (63) of a plurality of blade arrangements (60) are connected in an air-conducting manner to an intermediate chamber (46) of the rotor (40) via a respective recess (62), and wherein the air distribution chamber (45) is connected in an air-conducting manner to the intermediate chamber (46).

A11. The distribution device according to any of paragraphs A1 to A10, wherein the rotor (40) comprises a further rotor outer wall (42), wherein the rotor inner wall (43) is arranged between the two rotor outer walls (41, 42), preferably closer to the rotor outer wall (42) at the driving side.

A12. The distribution device according to paragraph A11, wherein the further rotor outer wall (42) comprises an aperture (54) for flowing the slurry into an internal slurry chamber (53) of the rotor (40).

A13. The distribution device according to any of the preceding paragraphs, wherein the rotor (40) is radially at the outside open at some places, so that the slurry can flow radially outwards through the rotor (40) into a free space between the rotor (40) and the housing (2).

A14. The distribution device according to any of the preceding paragraphs, wherein the rotor (40) comprises a first width (67), which is parallel to the rotation axis (10), and the air distribution chamber (45) comprises a clear second width (68), which is parallel to the rotation axis (10), wherein the second width (68) is at most 50%, preferably at most 35%, particularly preferably at most 25%, of the first width (67).

What is claimed is:

1. A distribution device for a slurry comprising liquid and solid constituents, comprising:
    a housing with an inlet for the slurry, an end wall at a driving side, an opposite further end wall and a plurality of outlets at one or both of the two end walls for distributing the slurry,
    a rotor, which is arranged in the housing and rotatable about a rotation axis, with
        at least one blade arrangement for sweeping over the outlets at the inside of the housing, and
        an air distribution chamber for distributing compressed air to the at least one blade arrangement,
    a driving unit with a motor, which is arranged outside the housing, and a drive shaft, which is coaxial with the rotation axis, passes through the end wall at the driving side and is connected to the rotor in a rotationally fixed manner, and
    an annular air chamber, which passes the end wall at the driving side and is arranged coaxially with the rotation axis and radially outside the drive shaft, wherein the annular air chamber is connected to an air inlet for compressed air at the outside of the housing and to the air distribution chamber at the inside of the housing in an air-conducting manner, and wherein the annular air chamber is entirely outside the drive shaft.

2. The distribution device according to claim 1, wherein the air distribution chamber is formed by a rotor outer wall at the driving side and a rotor inner wall spaced from the rotor outer wall along the rotation axis.

3. The distribution device according to claim 2, wherein the air distribution chamber is delimited radially inwardly by the drive shaft.

4. The distribution device according to claim 3, wherein the air distribution chamber comprises an opening in the rotor outer wall at the driving side, through which the drive shaft extends, wherein radially outside the drive shaft an annular region of the opening is formed as a transition of the annular air chamber into the air distribution chamber.

5. The distribution device according to claim 2, wherein the drive shaft is flanged to the rotor inner wall and the rotor inner wall is arranged to transmit torque from the driving shaft to the rest of the rotor.

6. The distribution device according to claim 2, wherein the rotor comprises a further rotor outer wall, wherein the rotor inner wall is arranged between the two rotor outer walls, closer to the rotor outer wall at the driving side.

7. The distribution device according to claim 6, wherein the further rotor outer wall comprises an aperture for flowing the slurry into an internal slurry chamber of the rotor.

8. The distribution device according to claim 1, wherein the driving unit comprises a motor flange, wherein the drive shaft is rotatably mounted in the motor flange, wherein one side of the motor flange is flanged to the end wall of the housing at the driving side and the motor is flanged to an opposite side of the motor flange, and wherein the air inlet is formed at the motor flange.

9. The distribution device according to claim 8, wherein an outside of the annular air chamber is radially delimited by an annular component of the rotor which is coaxial with the rotation axis and a first sliding seal is arranged between a radial outside of the annular component, and the motor flange.

10. The distribution device according to claim 9, wherein the motor flange protrudes through the end wall at the driving side into an interior of the housing, is thereby spaced from the rotor by a distance and the annular component bridges the spacing distance.

11. The distribution device according to claim 8, wherein an inside of the annular air chamber is radially delimited by the motor flange.

12. The distribution device according to claim 11, wherein the annular air chamber is delimited radially at the inside by the drive shaft.

13. The distribution device according to claim 8, wherein the annular air chamber is delimited radially at the outside by an annular component, which is coaxial with the rotation axis, wherein the annular component is arranged at the motor flange side and a first sliding seal is arranged between a radial outside of the annular component, and the motor flange.

14. The distribution device according to claim 1, wherein the at least one blade arrangement comprises a cavity and at least one annular or tubular blade, wherein the cavity is connected in an air-conducting manner to the air distribution chamber, wherein the blade sweeps over the outlets at the inside of the housing when the rotor is rotated and thereby the cavity is connected in an air-conducting manner to the outlet through the annular or tubular blade.

15. The distribution device according to claim 14, wherein the at least one blade arrangement is a plurality of blade arrangements, each blade arrangement comprising a cavity and at least one annular or tubular blade, and the cavities of the plurality of blade arrangements are connected in an air-conducting manner to an intermediate chamber of the rotor via a respective through-hole, and wherein the air distribution chamber is connected in an air-conducting manner to the intermediate chamber.

16. The distribution device according to claim 1, wherein the rotor is open at some places, so that the slurry can flow radially outwards through the rotor into a free space between the rotor and the housing.

17. The distribution device according to claim 1, wherein the rotor comprises a first width, which is parallel to the rotation axis, and the air distribution chamber comprises a second width, which is parallel to the rotation axis, wherein the second width is at most 50% of the first width.

18. The distribution device according to claim 17, wherein the second width is at most 35% of the first width.

19. The distribution device according to claim 18, wherein the second width is at most 25% of the first width.

* * * * *